(12) United States Patent
Naman et al.

(10) Patent No.: US 12,162,548 B2
(45) Date of Patent: Dec. 10, 2024

(54) STEER BY WIRE DRIFT COMPENSATION

(71) Applicant: Steering Solutions IP Holding Corporation, Saginaw, MI (US)

(72) Inventors: Apurv Naman, Saginaw, MI (US); Tejas M. Varunjikar, Troy, MI (US); Bhuvanesh Sainath, Saginaw, MI (US); Rangarajan Ramanujam, Saginaw, MI (US); Prerit Pramod, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 455 days.

(21) Appl. No.: 16/514,396

(22) Filed: Jul. 17, 2019

(65) Prior Publication Data

US 2021/0016826 A1  Jan. 21, 2021

(51) Int. Cl.
  *B62D 6/00* (2006.01)
  *B62D 1/04* (2006.01)
  *B62D 5/00* (2006.01)

(52) U.S. Cl.
  CPC .............. *B62D 6/005* (2013.01); *B62D 1/04* (2013.01); *B62D 5/001* (2013.01); *B62D 5/008* (2013.01); *B62D 6/008* (2013.01)

(58) Field of Classification Search
  CPC .......... B62D 1/04; B62D 5/001; B62D 5/008; B62D 6/005; B62D 6/008; B62D 6/04; B62D 6/00
  USPC ......................................................... 701/42
  See application file for complete search history.

(56) References Cited

U.S. PATENT DOCUMENTS

| | | | |
|---|---|---|---|
| 6,098,296 A | 8/2000 | Perisho, Jr. et al. | |
| 7,725,227 B2 | 5/2010 | Pattok et al. | |
| 2003/0146037 A1* | 8/2003 | Menjak | B62D 5/006 180/402 |
| 2012/0041658 A1* | 2/2012 | Turner | B62D 15/0245 701/1 |
| 2014/0324294 A1* | 10/2014 | Champagne | B62D 5/049 701/41 |

(Continued)

FOREIGN PATENT DOCUMENTS

| | | |
|---|---|---|
| CN | 104129425 A | 11/2014 |
| CN | 105473419 A | 4/2016 |

(Continued)

OTHER PUBLICATIONS

U.S. Department of Transportation: National Highway Traffic Safety Administration, "Functional Safety Assessment of a Generic Steer-by-Wire Steering System With Active Steering and Four-Wheel Steering Features", Aug. 2018, pp. 15-20 (Year: 2018).*

(Continued)

*Primary Examiner* — Abby J Flynn
*Assistant Examiner* — Sean Patrick Reidy
(74) *Attorney, Agent, or Firm* — Dickinson Wright PLLC

(57) ABSTRACT

A steer by wire system includes a controller operable to operate a roadwheel actuator such that a position command to the roadwheel actuator based on a handwheel orientation is a magnitude corresponding to a handwheel orientation offset value in an opposite direction to reduce a difference between the handwheel orientation offset value and a predetermined handwheel zero value.

6 Claims, 7 Drawing Sheets

(56) References Cited

U.S. PATENT DOCUMENTS

| | | | | |
|---|---|---|---|---|
| 2016/0114832 A1* | 4/2016 | Taniguchi | ............... | B62D 6/04 |
| | | | | 701/41 |
| 2018/0079407 A1* | 3/2018 | Izumi | ................ | B62D 15/0225 |
| 2018/0208235 A1* | 7/2018 | Miyashita | ............. | B62D 5/003 |
| 2018/0339727 A1* | 11/2018 | Ueyama | ................ | B62D 5/065 |
| 2020/0198397 A1* | 6/2020 | Wilson | ............... | B60B 35/1045 |
| 2021/0009122 A1* | 1/2021 | Nath | .................... | B60W 50/14 |

FOREIGN PATENT DOCUMENTS

| | | |
|---|---|---|
| CN | 107471352 A | 12/2017 |
| CN | 108466611 A | 8/2018 |
| CN | 108602529 A | 9/2018 |
| DE | 102014204461 A1 | 11/2014 |
| DE | 112010005308 B4 | 5/2017 |
| DE | 102017207229 A1 | 10/2018 |
| JP | 2018114934 A | 7/2018 |

OTHER PUBLICATIONS

German Examination Request with English translation mailed Mar. 25, 2022 for German Application No. 10 2020 117 939.1, 16 pages.
Chinese Office Action and Search report from the Chinese Patent Office fore related Chinese Patent Application No. 202010683916.7 dated May 30, 2022, 9 pages.
Second Chinese Office Action from the Chinese Patent Office for related Chinese Patent Application No. 202010683916.7 dated Jan. 12, 2023, 8 pages.

* cited by examiner

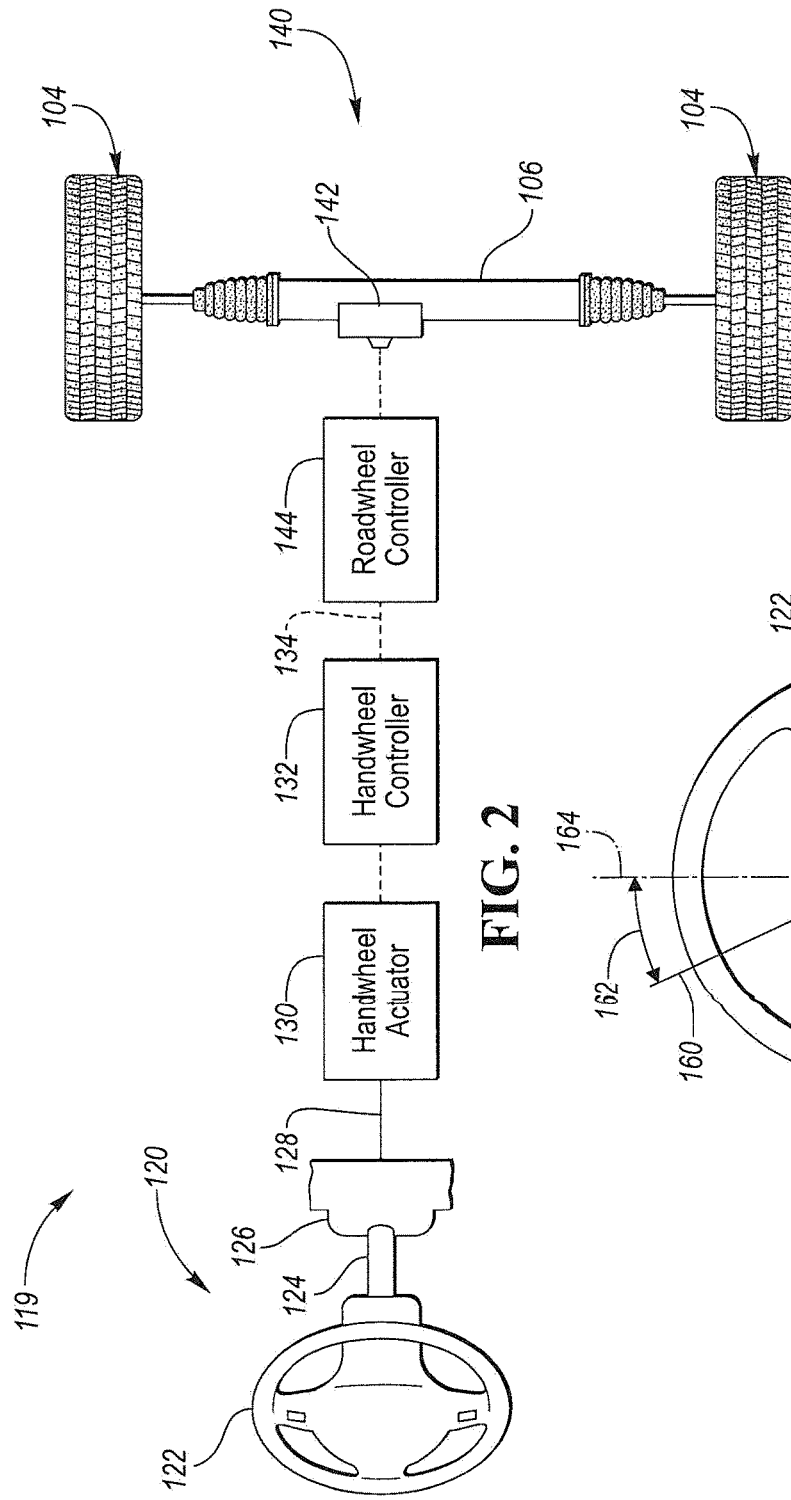
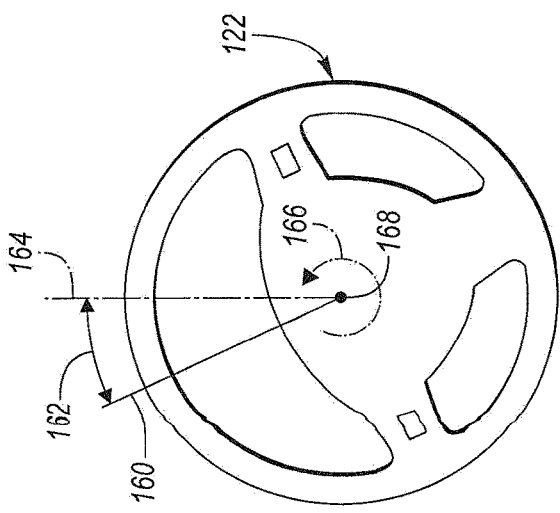
FIG. 2
FIG. 3

STEER BY WIRE DRIFT COMPENSATION

BACKGROUND OF THE INVENTION

The present disclosure relates to drift compensation for steer by wire systems.

Steer by wire systems mechanically disconnect operator interfaces, such as a steering or handwheel, from wheel attitude adjustment mechanisms. That is, the steering shaft or column may be partially or completely removed, and steering instructions from operators are sent to powered wheel attitude adjustment systems. These roadwheel attitude adjustment systems or roadwheel actuators may translate rotational handwheel operation into lateral roadwheel movement. Strong winds, tire pressure mismatches, and other travel situations require operators to rotate the handwheel to an offset angle in order to maintain straight vehicle movement.

SUMMARY OF THE INVENTION

Disclosed is a steer by wire system that includes a controller operable to operate a roadwheel actuator such that a position command to the roadwheel actuator based on a handwheel orientation is a magnitude corresponding to a handwheel orientation offset value in an opposite direction to reduce a difference between the handwheel orientation offset value and a predetermined handwheel zero value.

The roadwheel actuator operation is responsive to a handwheel orientation defined by an angular position of a handwheel having a handwheel orientation offset value corresponding to a substantially straight desired direction of travel with respect to a predetermined handwheel zero value less than a predetermined handwheel orientation threshold and a yaw rate associated with a rate of a change of a yaw position about a yaw axis being less than a predetermined yaw rate threshold.

Also disclosed is a steer by wire system that includes a handwheel actuator. The steer by wire system further includes a controller operable to operate a handwheel actuator such that a torque command to the handwheel actuator based on a rack force observer is a magnitude corresponding to the handwheel orientation offset value in an opposite direction to reduce a difference between a handwheel torque and a steady state resistance torque.

The handwheel operation is responsive to a handwheel orientation defined by an angular position of a handwheel having a handwheel orientation offset value corresponding to a substantially straight desired direction of travel with respect to a predetermined handwheel zero value less than a predetermined handwheel orientation threshold and a yaw rate associated with a rate of a change of a yaw position about a yaw axis being less than a predetermined yaw rate threshold.

Also disclosed is a controller program product of a steer by wire system, the controller program product that includes a controller readable storage medium having program instructions embodied thereon and executable by the controller to receive a handwheel orientation defined by an angular position of a handwheel having a handwheel orientation offset value corresponding to a substantially straight desired direction of travel with respect to a predetermined handwheel zero value less than a predetermined handwheel orientation threshold.

The program instructions embodied thereon and executable by the controller to receive a yaw rate associated with a rate of a change of a yaw position about a yaw axis being less than a predetermined yaw rate threshold.

The program instructions embodied thereon and executable by the controller to operate a handwheel actuator such that a torque command to the handwheel actuator based on a rack force observer is a magnitude corresponding to the handwheel orientation offset value in an opposite direction to reduce a difference between a handwheel torque and a steady state resistance torque.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 2 is a system diagram of a steer by wire system;

FIG. 3 depicts a handwheel having an angular position;

DETAILED DESCRIPTION

Steer by wire systems may fully or partially disconnect mechanical linkages between a steering axle of a vehicle and an operator interface. For example, a handwheel portion or orientation sensor may detect movement of a handwheel and transmit control signals to a roadwheel actuator to move the desired direction. The roadwheel actuator may be attached to a pinion and associated with a rack to adjust the roadwheel position. Feedback may be provided to the operator of the handwheel by a handwheel actuator such that realistic position or torque feedback is provided.

Crosswinds, disparate tire pressures, road embankments and many other travel phenomena may cause unnatural adjustments to handwheel position during travel. For example, a strong and steady crosswind may cause a vehicle traveling along a straight roadway to veer off the road. Naturally, the operator may adjust the handwheel position to counteract the crosswind and maintain a straight direction. The operator may maintain the handwheel in an offset position that may feel unnatural. The controller or controllers associated with the handwheel actuator and roadwheel actuator may be configured to adjust torques felt by the operator and maintain the vehicle in a straight direction to compensate for the crosswind forces.

Changes to the roadwheel actuator to maintain a straight course may undesirably maintain a torque on the handwheel. The torque may be configured to provide the operator with an indication of the crosswind while the handwheel is in a centered orientation. As such, the torque may be removed under these conditions to improve operator experience.

Indeed, the handwheel may be in a centered position without torque while the roadwheel is oriented to compensate for the crosswind.

Figure 1:
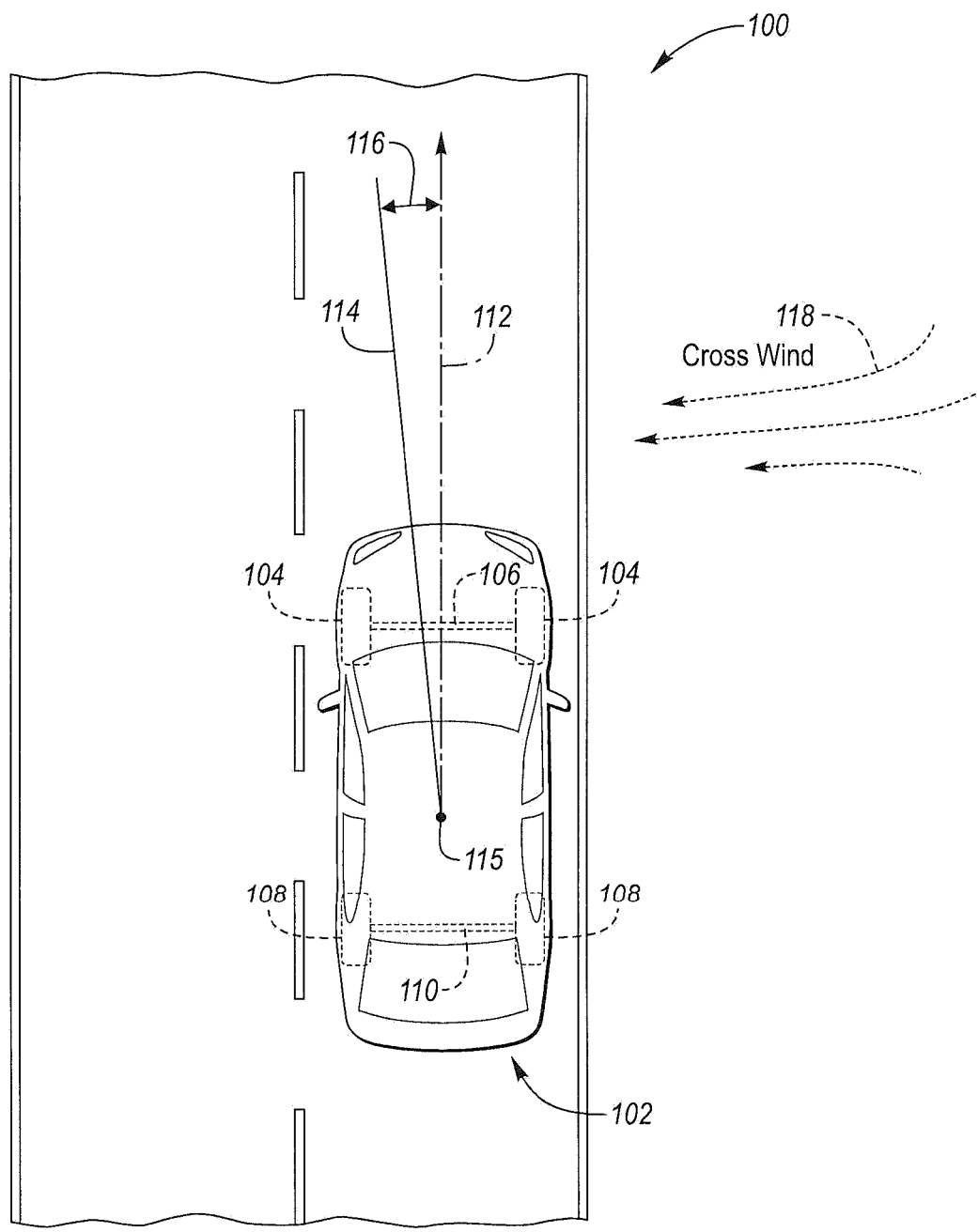
FIG. 1 is an overhead view of a vehicle traversing a roadway.

Referring now to the Figures, where the invention will be described with reference to specific embodiments, without limiting same, FIG. 1 depicts a roadway 100. A vehicle 102 is traversing the roadway. The vehicle includes roadwheels 104 associated with a front axle 106 and roadwheels 108 associated with a rear axle 110. The vehicle 102 has a substantially straight direction of travel 112 from a yaw axis 115. The yaw axis 115 is a vertical axis corresponding to a relative left to right motion (as shown) of the front of the vehicle 102 with respect to the rear of the vehicle 102. That is, yaw position about the yaw axis 115 describes rotational movement from this viewing aspect. Due to the crosswind 118 or other phenomena, the vehicle 102 has a veered trajectory 114 having an offset angle of 116 from the substantially straight direction of travel 112 about the yaw axis 115. Sensors may be placed on the vehicle 102 to monitor position, velocity, or acceleration of the yaw axis 115. For example, accelerometers may be used to measure a yaw rate of motion about the yaw axis 115 or a change rate of yaw position as a yaw rate. Similarly, other vehicle signals such as lateral velocity and acceleration, vehicle speed, wheel speeds etc. may also be obtained.

FIG. 2 shows a vehicle 102 having a steer by wire system 119 including a handwheel system 120 and a roadwheel system 140. The handwheel system 120 includes a handwheel 122, a handwheel shaft 124 and a housing or dash 126 that may include a handwheel actuator 130 connected to the handwheel shaft 124 by a handwheel coupler 128. The handwheel actuator 130 may be any type of actuator including an electric machine or other force generator. The handwheel actuator 130 in association with the coupler 128 may also include a worm and worm gear or another mechanical implement to transfer torque to the handwheel shaft 124. As such the handwheel actuator 130 may be operated by the handwheel controller 132 to provide the corresponding torque on the handwheel 122. The handwheel controller 132 may include a processor 138 and memory for performing methods described and not described herein.

A controller may include any combination of processors, field programmable gate arrays (FPGA), or application specific integrated circuits (ASIC). The controller may include memory, volatile and non-volatile, operable to store machine instructions from the processors and other processing mechanisms to receive, calculate, and control devices, as necessary. Machine instructions may be stored in any language or representation, including but not limited to machine code, assembly instructions, C, C++, C#, PASCAL, COBAL, PYTHON, JAVA, and RUBY. It should be appreciated that any type of wired or wireless configuration is appreciated for any of the communications from the controller. Wireless protocols such as ZIGBEE, WI-FI, BLUETOOTH, or any other implement may be used. Communications may be realized through any protocol or medium known or unknown.

The handwheel controller 132 may be in communication with a roadwheel controller 144 via a controller area network (CAN) 134 or another communication medium or protocol. It should be appreciated that any number of controllers may perform any or all of the methods or systems described herein. That is, only one controller or any plurality of controllers may operate the handwheel actuator 130 and roadwheel actuator 142 to compensate for crosswinds. The roadwheel controller 144 is connected to a roadwheel actuator 142. The roadwheel actuator 142 may be an electric machine, hydraulic system, or any other type of motive apparatus. The roadwheel actuator 142 may include a pinion and rack system configured to orient the roadwheels 104.

Referring to FIG. 3, the handwheel 122 is shown. The handwheel 122 has a handwheel orientation 166 about a handwheel axis 168. The handwheel orientation 166 may be defined relative to a predetermined handwheel zero value 164. For example, the predetermined handwheel zero value 164 corresponds to a vertical position of the handwheel 122. That is, the handwheel zero value 164 may correspond to a twelve o'clock position of the handwheel 122. The handwheel orientation 166 may be defined by an angular position 160 of the handwheel 122 having a handwheel orientation offset angle value 162.

Figure 4:
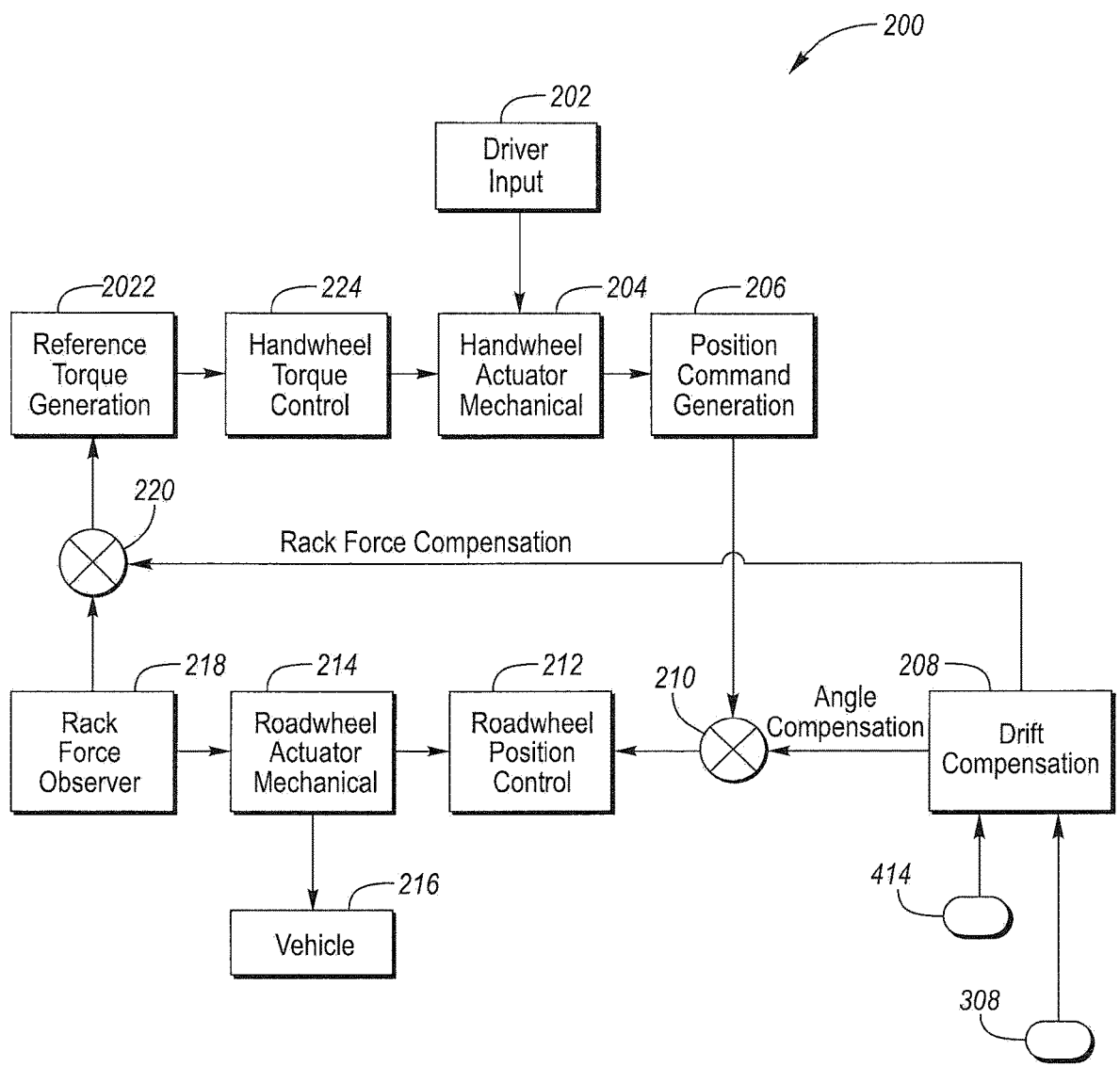
FIG. 4 is a control method of a steer by wire system.

Referring to FIG. 4, a control method 200 for a steer by wire system 119 is shown. The control method may be implemented on either of the controllers 132, 144, both of the controllers 132, 144, or particular functions may be implemented on one or both of the controllers 132, 144. The control method 200 includes handwheel position sensor input in block 202 of the handwheel 122. Block 204 receives the handwheel position sensor input from block 202 and outputs torque on the handwheel 122 via the handwheel actuator 130. The angular position 160 of the handwheel 122 generates a position command in block 206.

The position command may include position, rate, and acceleration in providing a command to the roadwheel position control input in block 212. The position control block may use control methods like PID to produce a torque command for actuator, 214, operation. Drift compensation may be implemented after the position command is sent in block 206 by the drift compensation algorithm in block 208 and the summation block 210 such that the roadwheel position is adjusted to compensate for drift. The roadwheel controller 144 operates the roadwheel actuator 142 in block 214. In block 216, the roadwheel actuator controls the lateral motion of the vehicle by roadwheel, 104, motion. In block 218, the rack force observer provides a torque or force indication from the rack of an expected counter torque to the handwheel 122 for the operator.

The handwheel controller 132 may receive the torque indication in block 218 and generate a reference torque in block 222 for the handwheel 122. The rack force observer torque is adjusted by the drift compensation algorithm in block 208 and in summation block 220 to remove feedback forces or torques associated with the drift. The handwheel controller 132 operates the handwheel actuator 130 in block 224 to provide responsive torque on the handwheel 122 such that the operator does not know that the vehicle 102 includes a steer by wire system 119 and is similar to an electric power steering system. Drift compensation 208 receives an estimated rack force 414 and a handwheel angle 308 as shown in FIG. 6.

Figure 5A:
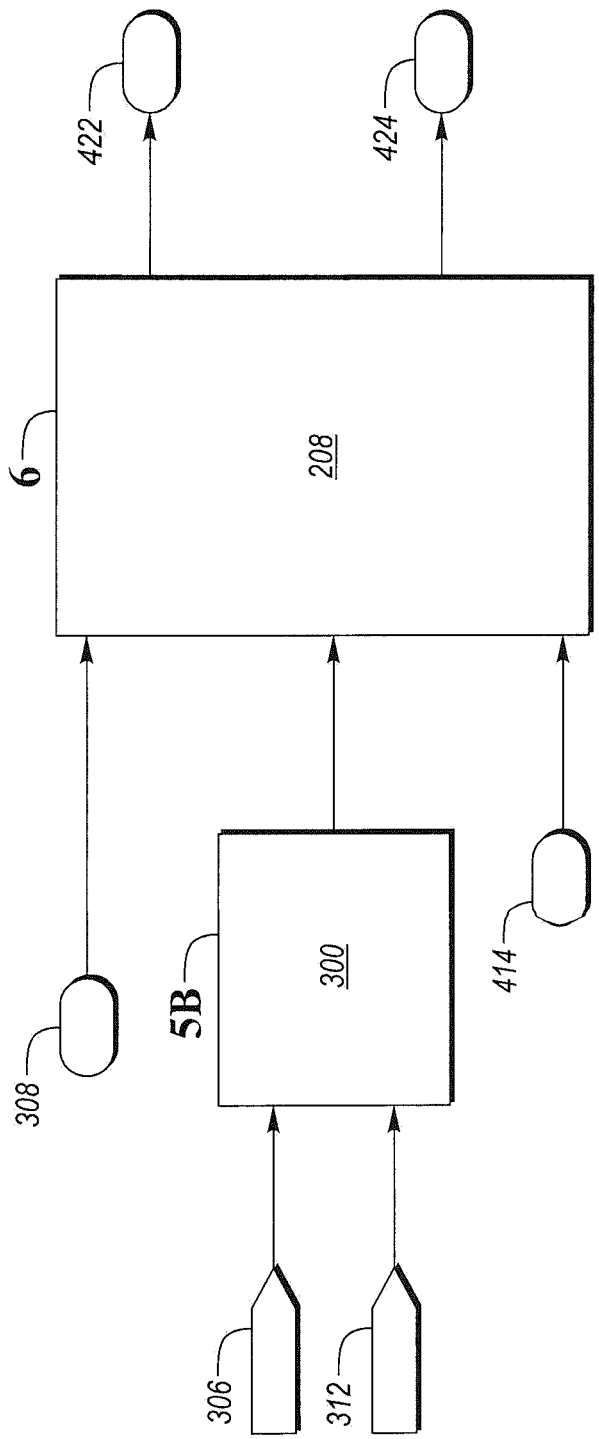
FIG. 5A is drift compensation method including a learning enable portion.
Figure 5B:
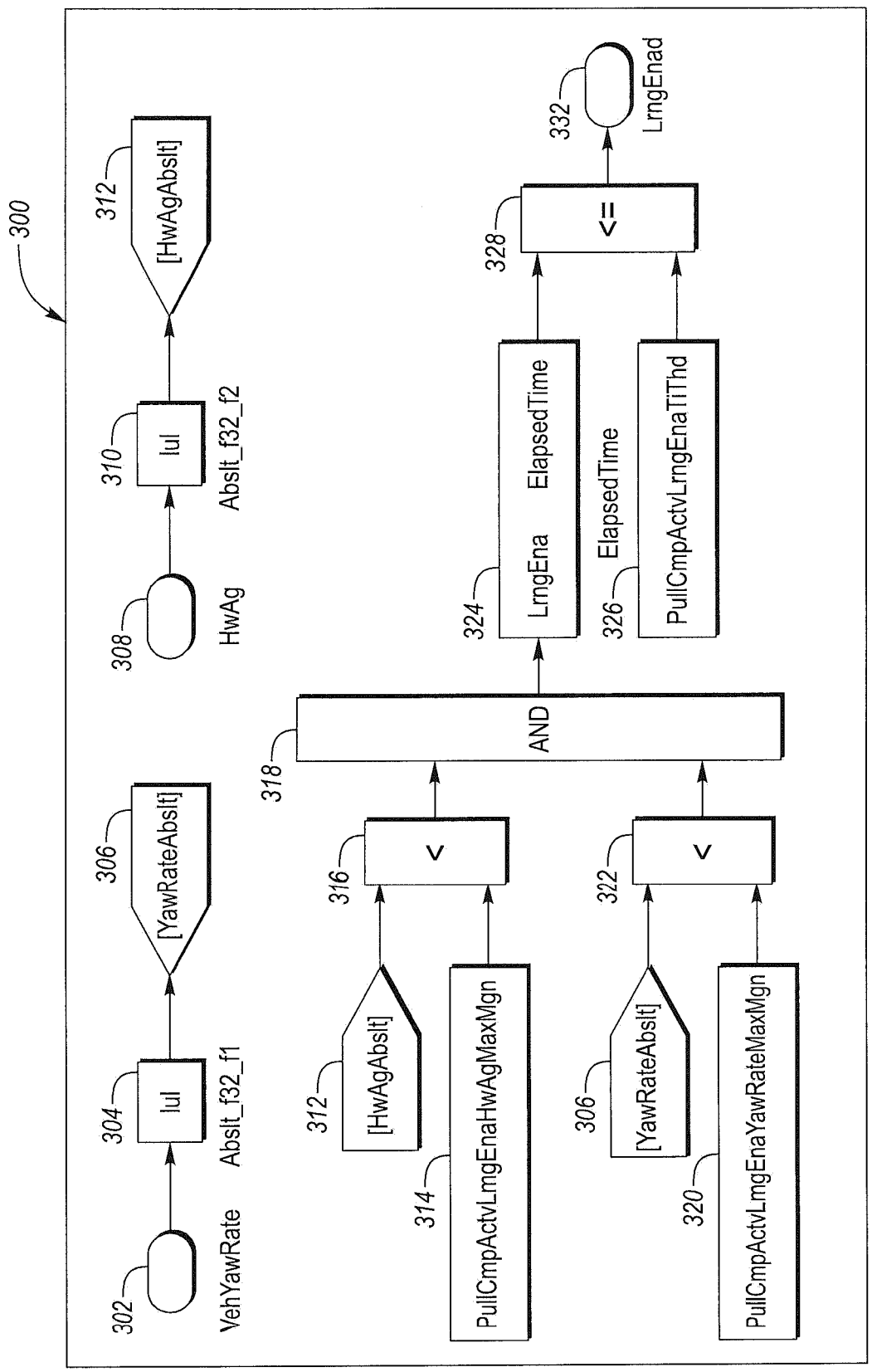
FIG. 5B is a learning enable method of a drift compensation method.
Figure 6:
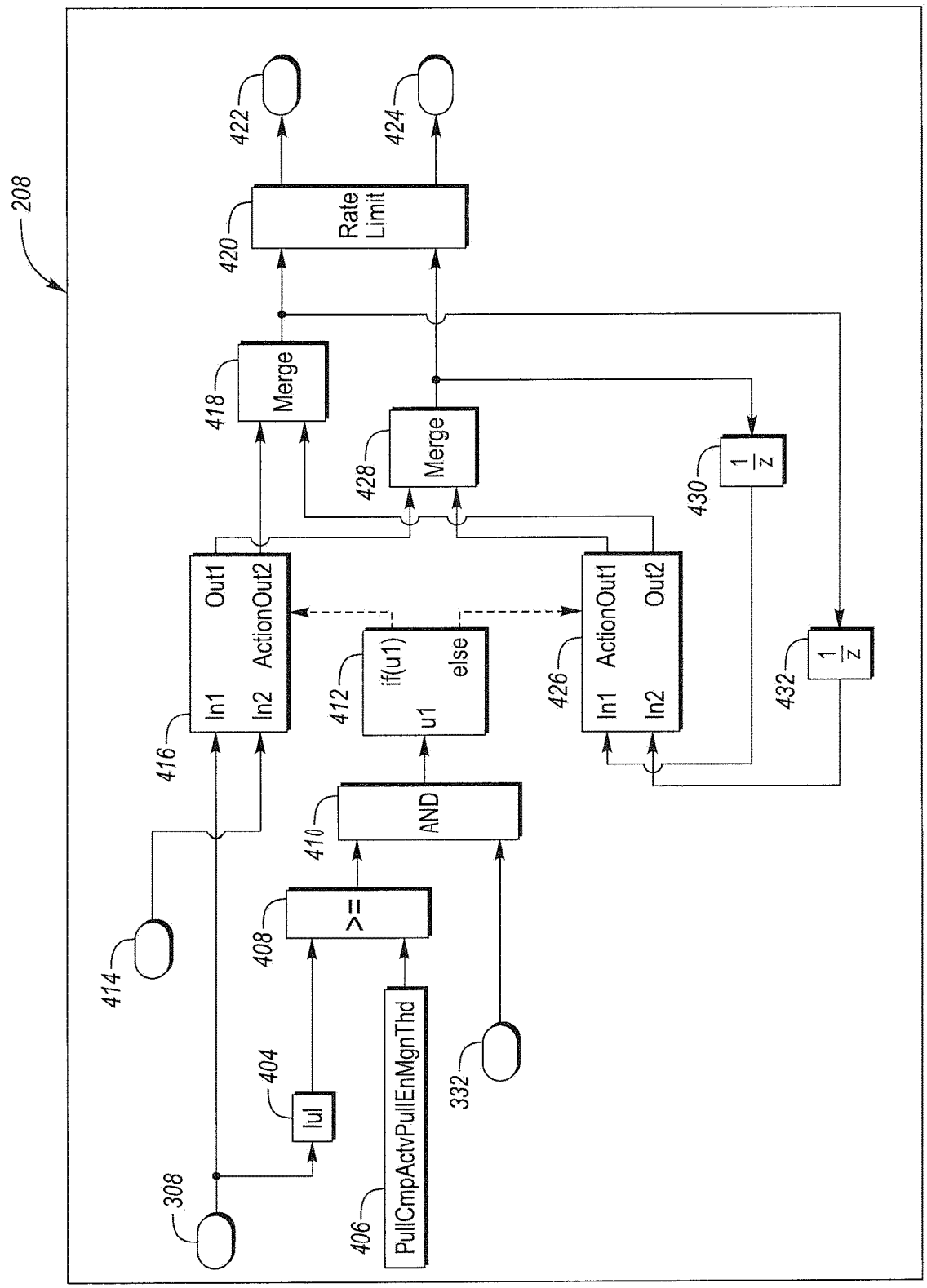
FIG. 6 is a drift compensation method of a steer by wire system.

Referring to FIGS. 5A, 5B, and 6, a learning enable control method 300 and drift compensation method 208 is shown. The learning enable control method 300 includes inputs from a yaw rate sensor 302 and a handwheel orientation sensor 308. However, it can be appreciated that equivalent signals can be used. For example, instead of using yaw rate signal, one can use the lateral acceleration signal or other signals, or even a combination of such signals indicative of vehicle motion. Similarly, an alternative to handwheel orientation sensor such as motor angle sensor for motor of handwheel actuator can be used to get handwheel orientation after appropriate gear ratio conversion. It should be appreciated that any technology to provide the requisite indications may be used. For example, piezoresistive or piezoelectric sensors may be used. An absolute yaw rate 306, or other similar other signal including lateral acceleration, and an absolute handwheel orientation 312 are inputs to learning enable method 300. Additionally, a non-absolute handwheel angle 308 and a rack torque 414 are provided for the drift compensation method 208. As such, the drift compensation method 208 compensates for handwheel angle torque 422 and rack torque 424.

Absolute values of these inputs are taken in blocks 304, 310, respectively, resulting in respective absolute yaw rate 306 and absolute handwheel orientation 312. To enable the remaining portions of the drift compensation method, the absolute yaw rate 306 and absolute handwheel orientation 312 are compared with a predetermined handwheel orientation threshold 314 and a predetermined yaw rate threshold 320. If both the absolute yaw rate 306 and absolute handwheel orientation 312 are less than the respective thresholds, a timer 324 may activate. If the output of 324, elapsed time is greater than or equal to the elapsed time threshold 326, then the control method 208 is activated. The respective thresholds may be defined based on turn values associated with the respective indications. That is, the learning enable method ensures that the control method 208 is only enabled during straight or pseudo straight transit and not when the operator is performing a turn. Threshold values may be adjusted and vary based on vehicle and location. Threshold values may be learned and based on statistical methods.

FIG. 6 includes a control method 208 for correcting drift in a steer by wire system 119 is shown. The handwheel orientation sensor 308 input is received by the method 208. It should be appreciated that the handwheel orientation 166 may be a tag associated with an analog or digital input of the controller. In block 404, an absolute value of the handwheel orientation sensor 308 input is taken. A predetermined deadband threshold 406 is compared with the absolute value to ensure that the drift is substantial enough to warrant the control method 208. If the learning enable input 332, as determined by the learning enable method 300, is true and the absolute value of the handwheel orientation sensor 308 is greater than the predetermined deadband threshold 406, the conditional block 412 receives the authorization operation to counteract drift in conditional block 416. Similarly, the cutoff frequency of the low-pass filter can be a function of vehicle speed.

As such, outputs 422, 424 are created that operate the roadwheel actuator 142 to move the roadwheels 104 to counteract the crosswind 118. That is, the control method 208 operates the roadwheel controller 144 to such that the position command 212 to the roadwheel actuator 142 angles the roadwheels 104 to counter the crosswind 118 as a function of the angular position 160 that corresponds to the handwheel orientation offset angle value 162. Over time, the difference between the handwheel orientation offset angle value 162 (equal to the required correction by the driver) and the predetermined handwheel zero value 164 will reduce as the roadwheels 104 are angled to counteract the crosswind 118 in an amount, or portion thereof, that is equal to the handwheel orientation offset angle value 162. That is, the handwheel orientation offset angle value 162 is equal to the required adjustment to the roadwheel 104 orientation. An adjustment by the roadwheel actuator 142 to correspond to the handwheel orientation offset angle value 162 is necessary to counteract at least a portion of drift caused by the crosswind 118. The compensation outputs 422, 424 update current values via merge blocks 418, 428. A rate limit 420 may be implemented to limit the rate of change for each of the compensation outputs 422, 424. Each of the outputs 422, 424 may have respective limits to improve operator experience and reduce sudden changes. The Rate Limit block, 420, limits the first derivative of the signal passing through it. The output changes no faster than the specified limit. The upper and lower limits can be a function of vehicle speed as well. In this case, the rate limit block, 420, applies rate limiting to outputs of 418 and 428 separately. Alternatively, or additionally, a low-pass filter block may be used.

In latch block 426, the previous cycle values are held in unit delay blocks 430, 432 when the input from the AND gate 410 is not true. As such, the control method 208 is not operated and previous values (without drift compensation) are used.

Figure 7:
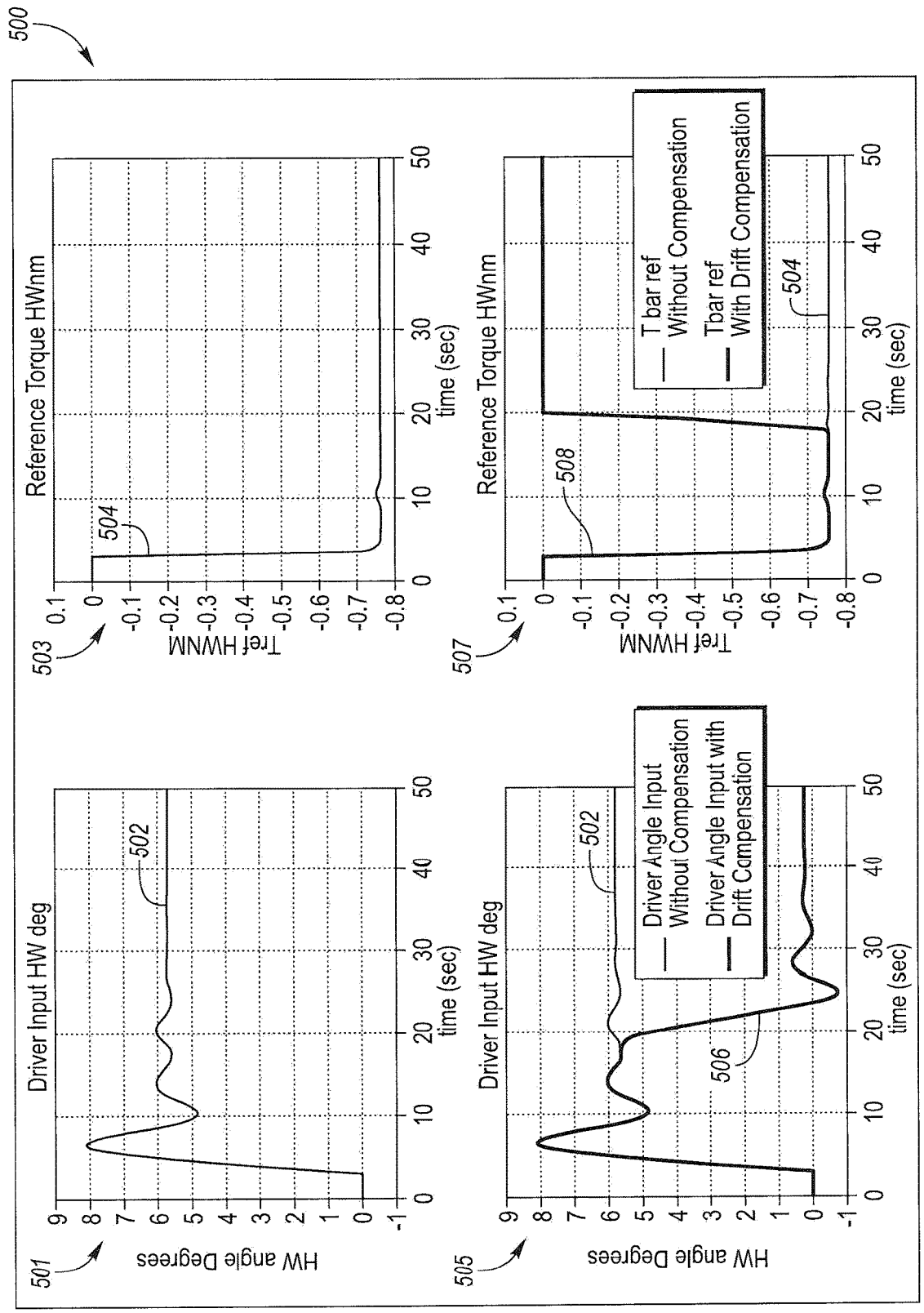
FIG. 7 is a set of graphs depicting a drift compensated steer by wire system.

Referring to FIG. 7, graphs 500 showing system performance are shown. In graph 501, a curve 502 depicts the handwheel orientation offset angle value 162 when the vehicle 102 is exposed to a crosswind 118 or other drift phenomena without the control method disclosed. In graph 503, a curve 504 depicts the handwheel torque caused by the torque control block 224 when the vehicle 102 is exposed to a crosswind 118 or other drift phenomena without the control method disclosed.

In graph 505, the curve 502 is compared to the curve 506 with the implemented control method 208 as described showing that the handwheel orientation offset angle value 162 reaches a predetermined deadband threshold 406 over time according to the control method 208.

In graph 507, the curve 504 is compared to the curve 508 with the implemented control method 208 as described showing that the handwheel torque from the handwheel torque control block 224 returns to or approaches zero over time according to the control method 208 when the feedback torque from the rack observer 218 is compensated by the drift compensation algorithm 208.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steer by wire system, the system comprising:
a handwheel actuator; and
a controller operable to:
determine whether a handwheel orientation, defined by an angular position of a handwheel, having a handwheel orientation offset value corresponding to a substantially straight desired direction of travel with respect to a predetermined handwheel zero value, wherein the predetermined handwheel zero value is less than a predetermined handwheel orientation threshold; and
in response to determining that the handwheel orientation offset value corresponds to the substantially straight desired direction of travel with respect to the predetermined handwheel zero value:
determine whether a yaw rate associated with a rate of a change of a yaw position about a yaw axis is less than a predetermined yaw rate threshold; and
determine whether a lateral acceleration is less than a predetermined lateral acceleration threshold; and activate a timer in response to determining that (1) the yaw rate associated with the rate of the change of the yaw position about the yaw axis is less than the predetermined yaw rate threshold, and (2) the lateral acceleration is less than the predetermined lateral acceleration threshold;

deactivate the timer in response to at least one of (1) the yaw rate associated with the rate of the change of the yaw position about the yaw axis is not less than the predetermined yaw rate threshold, and (2) the lateral acceleration is not less than the predetermined lateral acceleration threshold; and in response to an elapsed time of the timer being greater than or equal to an elapsed time threshold:
 adjust a rack force observer to remove feedback forces or torque associated with drift, wherein the rack force observer is adjusted based on a handwheel angle and an estimated rack force; and
 operate the handwheel actuator such that a torque command applied to the handwheel actuator, based on the rack force observer, is a magnitude in an opposite direction to reduce a difference between a handwheel torque and a steady state resistance torque, wherein the handwheel torque is equal to the steady state resistance torque when the predetermined handwheel zero value corresponds to the substantially straight desired direction of travel, and wherein the substantially straight desired direction of travel is defined by a predetermined deadband threshold.

2. The steer by wire system of claim 1, wherein the handwheel torque is derived from a roadwheel actuation based on the handwheel orientation offset value on the handwheel orientation and the predetermined handwheel zero value.

3. The steer by wire system of claim 1, wherein the controller is further operable to receive the handwheel orientation and the yaw rate.

4. The steer by wire system of claim 1, wherein the controller is further operable to receive instructions to operate the handwheel actuator based on the handwheel orientation offset value and the yaw rate to reduce a difference.

5. The steer by wire system of claim 1, wherein the handwheel actuator is a handwheel electric motor configured to apply the handwheel torque to the handwheel.

6. The steer by wire system of claim 1, wherein the predetermined handwheel orientation threshold is based on a vehicle speed.

* * * * *